May 13, 1941.　　　F. D. JONES　　　2,242,077
WINDROW PICKUP PRESS
Filed Aug. 10, 1936　　　5 Sheets-Sheet 3
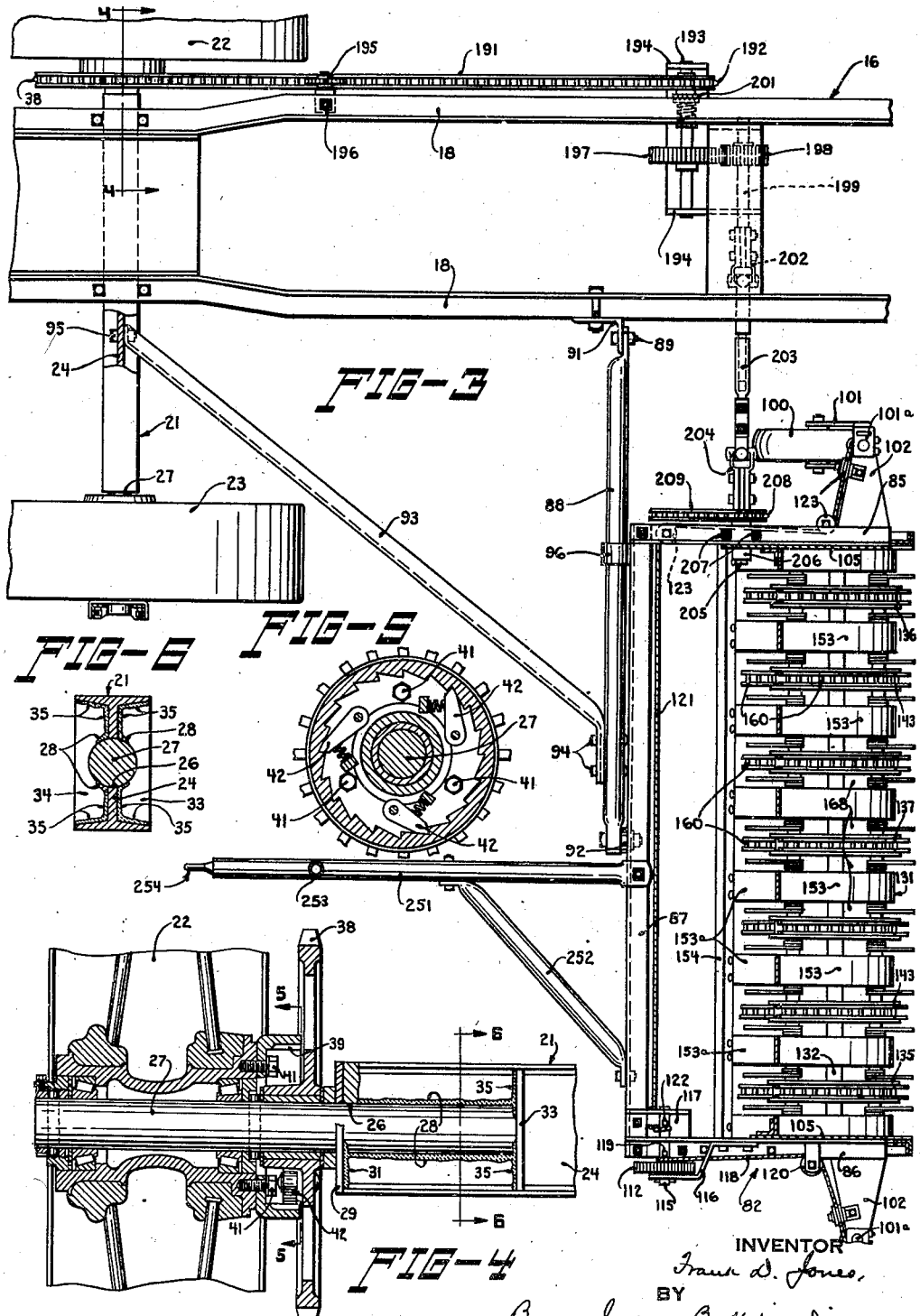

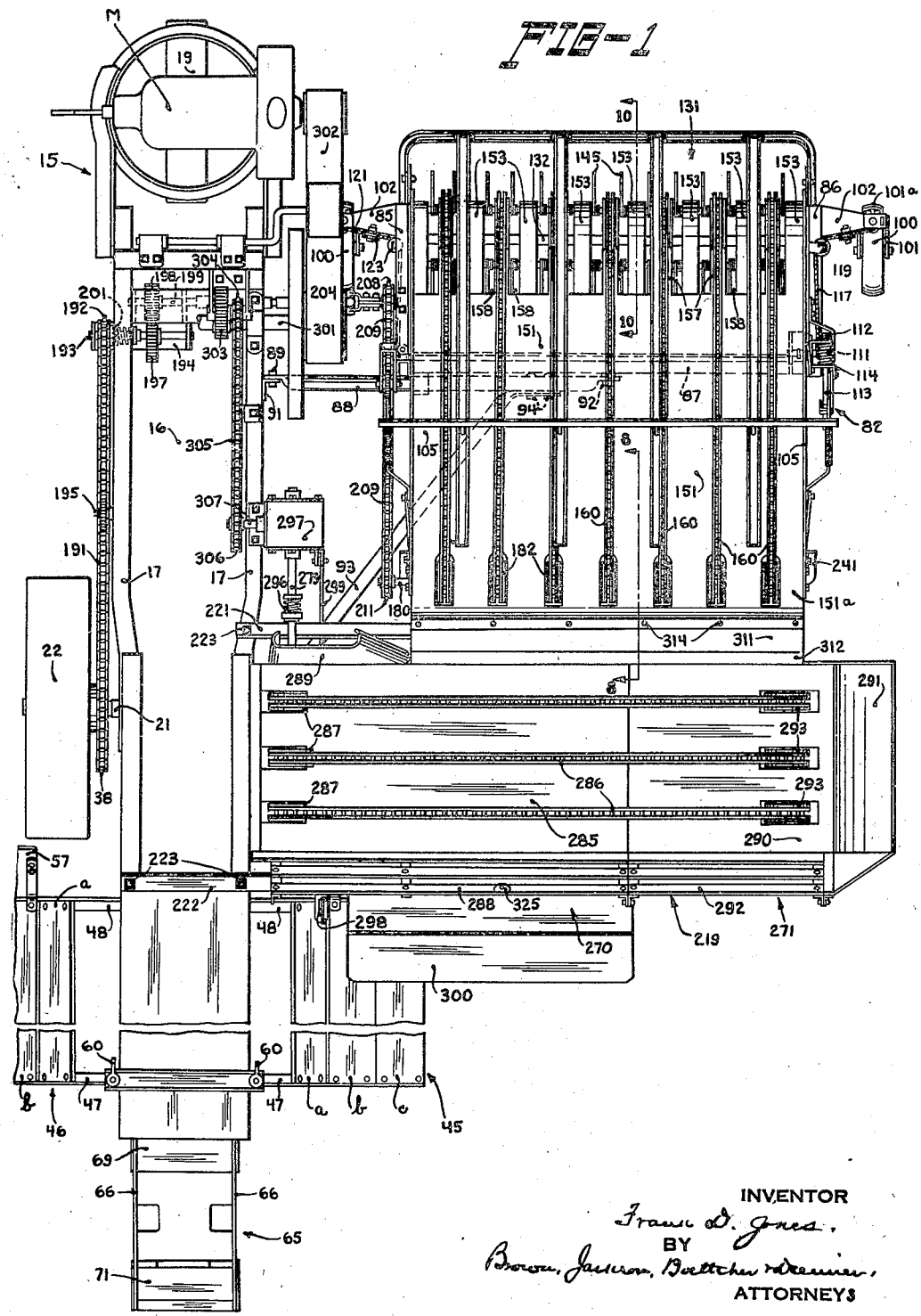

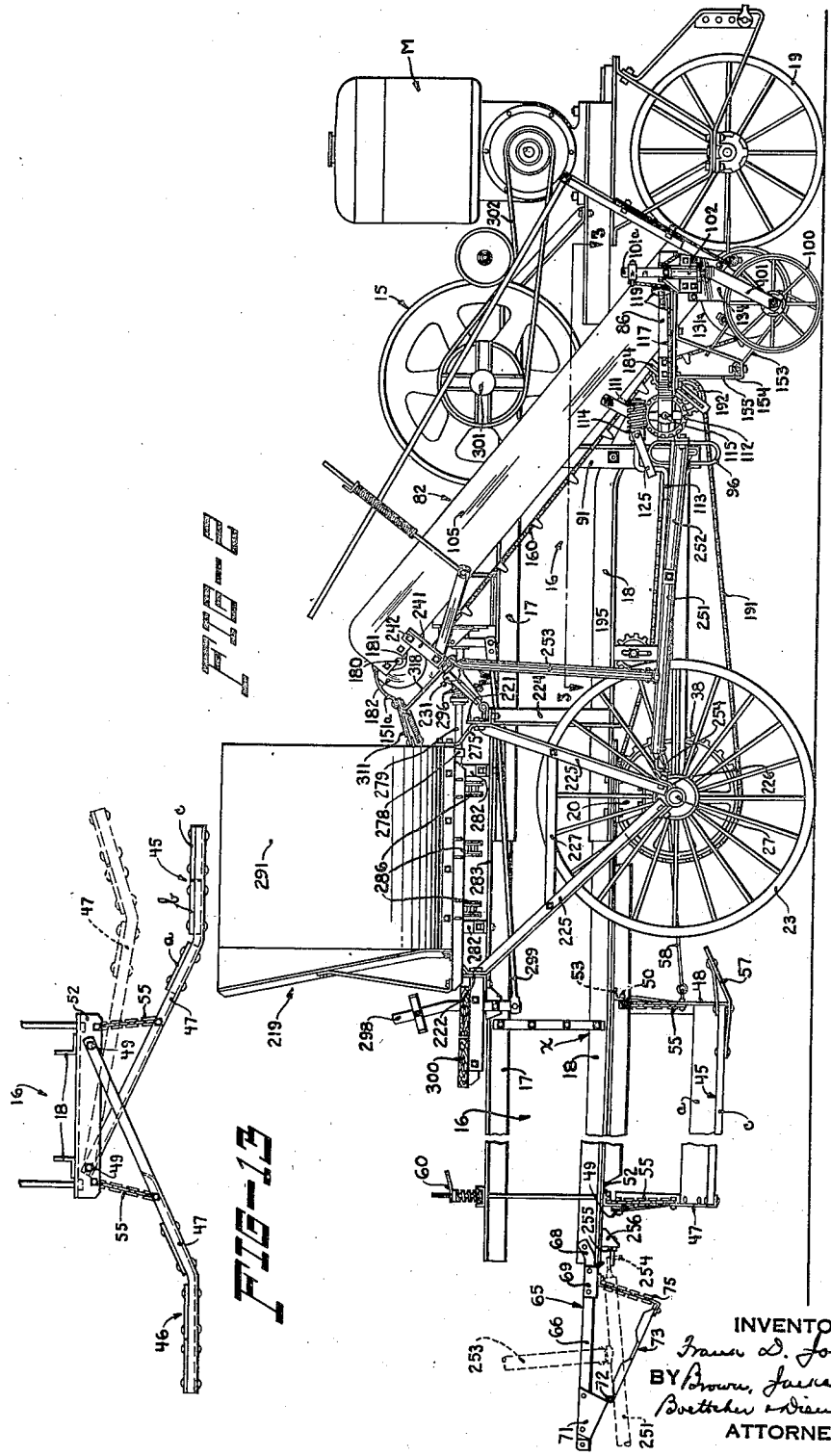

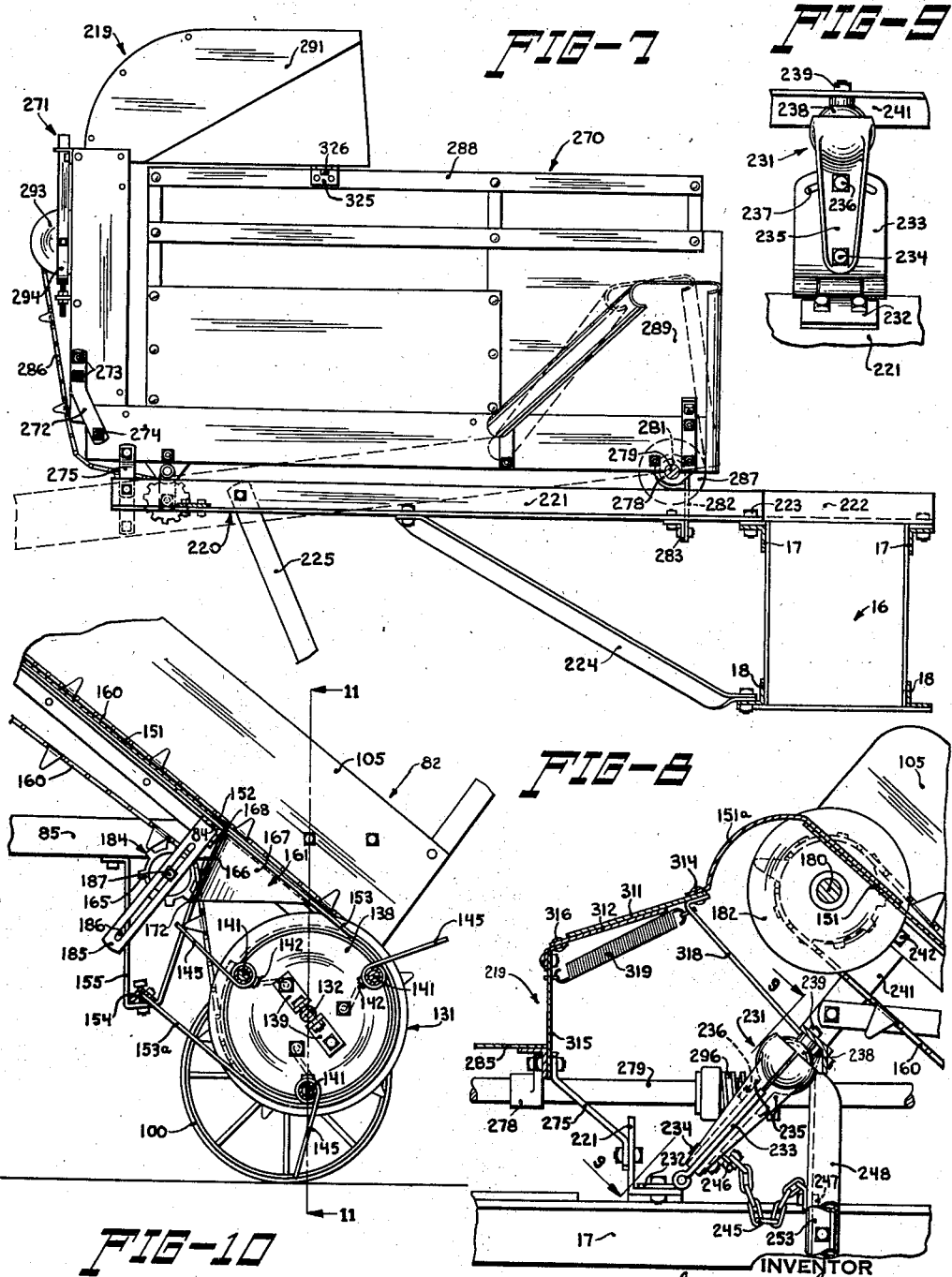

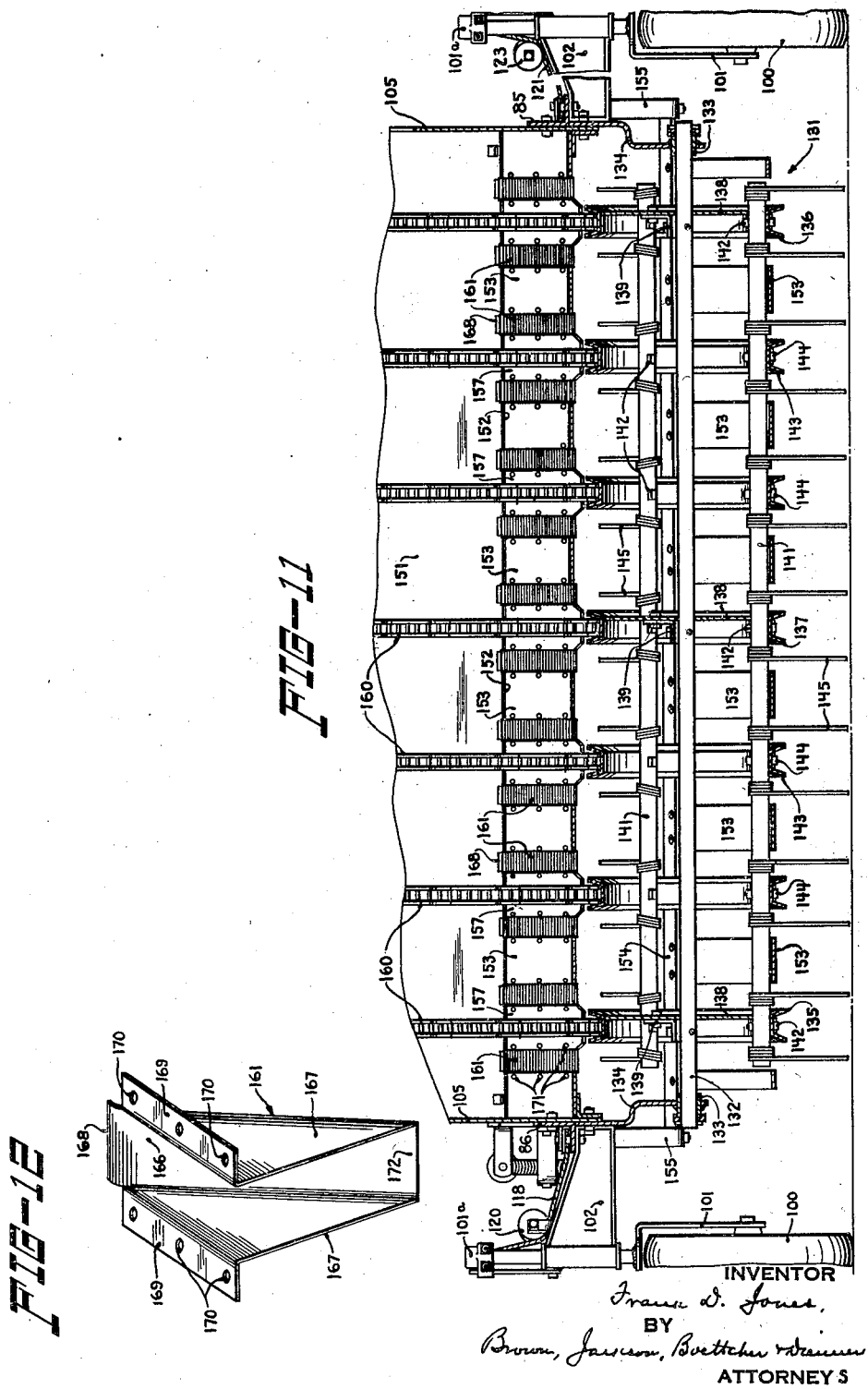

Patented May 13, 1941

2,242,077

UNITED STATES PATENT OFFICE 2,242,077

WINDROW PICKUP PRESS

Frank D. Jones, Ottumwa, Iowa, assignor to Dain Manufacturing Company of Iowa, Ottumwa, Iowa, a corporation of Iowa Application August 10, 1936, Serial No. 95,142

49 Claims. (Cl. 56—27)

This invention relates to windrow pickup presses of the type comprising a baler having a pickup and feeding mechanism connected at one side thereof whereby as the machine is drawn across the field the pickup device, which straddles a windrow of hay or other crop, picks up and elevates the material to a cross-conveyor which in turn delivers the material to the hay press or baler, where it is baled in the usual manner.

The principal object of the present invention is to provide improved means for attaching the pick-up device to the hay press not only in operating position but also in transport position, and whereby when connected in operating position the attaching means provides flexibility to allow the pickup device to accommodate itself to irregularities in the ground surface, independent of the hay press.

Another object of the invention is to provide a cross-conveyor made in two sections whereby one section can be folded over the other section for transport purposes to thereby reduce the width of the cross-conveyor, and wherein such section can be folded without first disconnecting the conveyor chains.

A further object of the invention is to provide improved means for mounting the cross-conveyor on its supporting frame whereby said conveyor may be inclined downwardly toward its outer end to facilitate the feeding of hay or other crops from a stack when the hay press is used as a stationary baler and without the pick-up device attached thereto.

A still further object of the invention is to simplify and improve the construction of the pickup cylinder and to reduce the weight thereof whereby less power is required to operate said cylinder.

A still further object of the invention is to provide the pick-up conveyor and the cross-conveyor with spring supported overlapping aprons or plates to provide a continuous surface for the passage of the hay or other crop in case some misalignment occurs between the two conveyors when the machine is traveling over uneven ground.

A still further object of the invention is to improve the construction of the supporting frame for the rear end of the hay press.

A still further object of the invention is to provide improved means for supporting the foot boards or platforms on which the operator stands when tying the bales in the hay press.

A still further object of the invention is to provide the pick-up device with improved stripper fenders for preventing the hay removed from the pick-up fingers by the strippers from being caught around the front edge of the deck plate.

A still further object of the invention is to provide improved mechanism for vertically adjusting the forward end of the pick-up device relatively to the supporting wheels.

A still further object of the invention is to provide improved means for connecting the stub axles of the rear supporting wheels to the I-beam axle.

The above and other objects and advantageous features will be apparent from the following description of the preferred embodiment of the invention taken in connection with the accompanying drawings in which—

Figure 1 is a top plan view of a windrow pick-up press embodying my improvements;

Figure 2 is a side elevational view of the same;

Figure 3 is a partial horizontal sectional view taken approximately on the plane of the line 3—3 of Figure 2;

Figure 4 is a vertical cross-sectional view on an enlarged scale, taken approximately on the plane of the line 4—4 of Figure 3, showing the mounting of the stub axles of the rear supporting wheels and the means for connecting the driving sprocket for the pickup mechanism to one of the supporting wheels;

Figure 5 is a vertical cross-sectional view taken approximately on the plane of the line 5—5 of Figure 4 and showing the ratchet mechanism for connecting the pickup mechanism driving sprocket to one of the supporting wheels.

Figure 6 is a cross-sectional view taken approximately on the plane of the line 6—6 of Figure 4 and showing the means for connecting the stub axles to the I-beam axle;

Figure 7 is a front elevational view of the cross-conveyor and its supporting frame, with the outer section of the conveyor in folded position, and showing also in dotted lines the position of the conveyor when the machine is used as a stationary press;

Figure 8 is a fragmentary sectional view, on an enlarged scale, taken approximately on the plane of the line 8—8 of Figure 1, showing the supporting means for the upper end of the pick-up conveyor and associated parts, and also showing the overlapping aprons between the pick-up conveyor and the cross-conveyor;

Figure 9 is an elevational detail view of the ball and socket supporting means shown in Figure 8;

Figure 10 is a longitudinal sectional view, taken approximately on the plane of the line 10—10 of Figure 1, showing on an enlarged scale the lower portion of the pickup conveyor;

Figure 11 is a transverse sectional view, on an enlarged scale, taken approximately on the line 11—11 of Figure 10 and showing the pickup cylinder and and the conveyor chain flanges in more detail;

Figure 12 is a perspective view, on an enlarged scale, of one of the stripper fenders; and Figure 13 is a rear elevational view showing the improved foot board arrangement adjacent the rear end of the baler.

Referring to the drawings, and particularly to Figures 1 and 2 thereof, the hay press indicated as an entirety by the reference numeral 15 is of conventional construction and comprises a longitudinally extending frame 16 the rear end of which serves as a bale case having upper and lower angle members 17 and 18, respectively, suitably connected together in the usual manner. The forward end of the frame is supported on a dirigible wheel 19 which is connected thereto in any approved manner, and a gasoline motor M is mounted on the frame 16 above the wheel 19. Each of the lower frame members 18 of the bale case, adjacent the rear end of the latter, is bolted to a channel-shaped member 20 (Figure 2), and the lower flanges of said members 20 are bolted to an I-beam axle 21, best illustrated in Figures 3 and 4, supported on carrying wheels 22 and 23. The means for connecting both of said wheels to the I-beam axle 21 is identical, and, therefore, the connecting means of but one of them will be described. As best shown in Figures 4 and 6, the central web portion 24 at each end of the I-beam axle 21 is provided with a recess 26 to receive the inner end of a stub axle 27 suitably secured to the web 24 by welding as shown at 28. A rectangular reinforcing plate 29 encircles each of the stub axles and is welded to the adjacent outer end of the I-beam axle 21 as shown at 31 in Figure 4. The inner end of the stub axle 27 is held in position by means of a pair of plates 33 and 34, one at each side of the stub axle as shown in Figure 6. The plates 33 and 34 are secured to the vertical web and the horizontal flanges of the I-beam by welding, as shown at 35. Hence the plates 33 and 34 provide the necessary stiffness laterally, and also serve to tie the whole end construction together. The rear carrying wheels 22 and 23 above mentioned are journalled for rotation on the outer ends of the stub axles 27.

A sprocket 38 is journaled on the stub axle 27 on which the carrying wheel 22 is journaled and is positioned between the wheel 22 and the plate 29 (Figure 4). This sprocket serves to drive the pickup mechanism by power derived from the wheel 22, and for this purpose a ratchet 39 is secured to the hub of the wheel 22 by means of a plurality of bolts 41 (Figures 4 and 5), and spring pressed pawls 42, pivoted on the sprocket 38, contact the ratchet 39 and drive the sprocket 38 on forward travel of the wheel 22. In case of reversal of travel, however, the ratchet 39 releases the pickup mechanism, as will be readily understood. The means for driving the several parts of the pick-up mechanism from the sprocket 38 will be described later in connection with the description of that mechanism.

Suitable platforms or footboards 45 and 46 are provided adjacent the rear end of the bale case or frame 16 as shown in Figures 1 and 2, one at each side of the frame (Figures 1 and 13), to provide a place for the operator who ties the bales. Each of the footboards comprises two longitudinally spaced angle iron supporting members or bars 47 and 48 pivotally connected at their inner ends by pivot bolts 49 and 50 to transversely extending longitudinally spaced angle members 52 and 53, respectively, extending between the lower frame members 18 and suitably secured at their opposite ends to said frame members. The pivotal supporting members 47 and 48 of each footboard extend downwardly and laterally from their pivotal connection with the frame as shown in Figure 13, and three boards indicated by a, b and c extend between the members 47 and 48 and are secured thereto in any suitable manner. These three boards provide a platform on which the operator stands during the operation of the machine.

Each of the footboards 45 and 46 is maintained in a level position by means of a pair of chains 55, one of the chains being bolted or otherwise suitably secured to the cross-member 52 and to the supporting member 47, while the other chain is similarly connected to the cross-member 53 and to the supporting member 48. A runner plate 57 is bolted or otherwise secured to the front end of each of the footboards 45 and 46 and extends forwardly and upwardly therefrom, and a rod 58 connects each of the front supporting members 48 of the footboards with the I-beam axle 21 (see Figure 2). This runner plate construction is provided so that in the event that the rear supporting wheels run into a rut in the field, the footboards 45 and 46 can move into the position shown in dotted lines in Figure 13, the runner plates 57 acting as guides or skids to prevent the front ends of the footboards from digging into the ground, and the rods 58 operating to pull the footboards along in sled fashion. By this construction the footboards can ride over ground obstructions smoothly and without damage.

The rear end of the bale case proper carries tensioning devices 60 of more or less conventional construction, connecting the angle bars 17 and 18 as best shown in Figure 2, and are adjustable to obtain the desired amount of material in each bale. The tailboard of the machine at the rear end of the bale case adjacent the tensioning devices 60 is indicated in its entirety by the reference numeral 65 and comprises two side frame members or bars 66 pivotally connected at 68 to the lower angle members 18 forming a part of the lower section of the bale case 16. Adjacent the pivots 68 the side members 66 are connected together by means of a plate 69, and at their ends the bars 66 are connected together by a plate 71. The plate 71 is inclined downwardly and forwardly and has pivotally connected to its forward end, as shown at 72, the rear end of a division block receiving means indicated in its entirety by the reference numeral 73. The forward end of the division block receiving means 73 is supported from the plate 69 by a chain 75. This tailboard and division block receiving means forms the subject-matter of my co-pending application, Serial No. 759,166, filed December 26, 1934, now matured into Patent No. 2,138,604 dated November 29, 1938 and, therefore, no further detail description ot the same herein is deemed necessary.

In former constructions of presses with which

I am familiar the longitudinally extending frame bars 17 and 18 of the bale case were formed straight and extended parallel to each other for their entire length, but it has been found that with such a construction when the tensioning devices 60 are tightened to obtain the required amount of material in the bales, the upper bale case angle bars 17 would be deflected downwardly about two inches. This deflection of the bars was sufficient to give them a permanent set and they would not return to their original normal position when the tensioning devices were again loosened. This deflection and permanent set of the upper bars, which is very undesirable as it throws the bale case out of alinement, has been avoided in the present construction by giving the lower angle bars 18 of the bale case a permanent set upward of about one inch, from the point marked x in Figure 2 to the rear ends thereof. With such a construction, when the tensioning devices 60 are tightened to get the proper amount of bale weight the upper bars 17 deflect only about one inch, and this deflection is not enough to strain the upper bars beyond their elastic limit and they will spring back to their original positions upon loosening of the tensioning devices 60. It should also be pointed out that the relatively long bale case angle bars 17 and 18 overhang the rear axle support to such an extent that there is a natural sag, which gives the press a drooping appearance, and this upward set given to the lower angle bars 18 overcomes this unfavorable appearance.

The windrow pickup device when connected to the baler in operating position is located at one side of the hay press as shown in Figures 1 and 3, and is suitably secured thereto. This pickup device is indicated in its entirety by the reference numeral 82 and includes a supporting frame comprising a transverse bar 84 (Figure 10) and a pair of longitudinally extending side angle bars 85 and 86 to which the transverse bar is secured and which are fixed at their rear ends in any suitable manner to a rear transverse angle bar 87 (Figure 3). The pickup device is connected to the hay press and pushed over the field by a frame comprising a transverse bar 88 pivotally connected at its laterally inner end, as shown at 89, to a vertically extending angle bar 91 which forms a part of the hay press frame 16, and is pivotally connected at its laterally outer end as shown at 92 to the center of the transverse angle bar 87 of the pickup device. A diagonal brace member 93, fixed at its forward end to the outer end of the bar 88 by bolts 94 and extending laterally inwardly and rearwardly to the axle beam 21 where it is connected to the central web 24 thereof by a pivot joint 95 in longitudinal alignment with the forward pivot 89, completes this connecting and pushing frame. As the pivot points 89 and 95 are co-axially disposed, the pushing frame 88, 93 is movable vertically about the pivot axis 89, 95. With this construction the pickup device may rise and fall with respect to the hay press, and the pivot point 92 between the pickup device and the push bar 88 permits the pickup device to tilt about a longitudinal axis with respect to the hay press in following the contour of the ground surface. A guide loop 96 is welded or otherwise suitably secured to the transverse angle bar 87 of the pickup device adjacent its inner end and encircles the push bar 88 to limit the amount of tilting movement of the pickup device relative to the push bar so as to prevent overturning of the pickup device.

The pickup device extends upwardly and rearwardly and also forwardly and downwardly from the push bar frame 88—93 and is supported at its forward end on a pair of carrying caster wheels 100, one of which is positioned at each side of the pickup frame. Each of said wheels 100 is journaled in a caster fork 101 which in turn in journaled in a vertically extending sleeve member formed integral with or suitably secured to a casting 102 suitably fixed to and extending outwardly from the associated side frame bar 85 or 86. Side plates 105 are rigidly fastened to the frame bars 85 and 86 and to the casting members 102.

The forward end of the pickup device is adjustable vertically relatively to the supporting wheels 100 by means of suitable mechanism including a worm and worm gear. As shown in Figure 2, this mechanism includes a worm 111 meshing with a worm gear 112 (Figures 2 and 3), and a crank 113 is fixed to the worm 111 and is journaled in a supporting bracket 114. As best shown in Figure 3, the worm gear 112 is fixed on a shaft 115 which is journaled in the vertical leg of the side frame angle 86, in an outside bracket 116 fastened to the frame angle 86 and also in the vertical leg of an angle plate 117 fixed in any suitable manner between the side frame angle 86 and the transverse frame angle 87. A cable 118 has one end suitably secured, as by a bolt 119 (Figure 3), to the worm wheel shaft 115 and extends forwardly therefrom and is trained around pulleys 120 and connected at its opposite end in any suitable manner to the upper end 101ᵃ of the right hand caster fork 101, at the left hand side of Figure 11. A second cable 121 has one end suitably secured, as by a bolt 122 (Figure 3), to the worm wheel shaft 115 and extends transversely across the pickup device along the frame bar 87 to the opposite side thereof. This cable 121 is trained around pulleys 123 at the left or inside end of the pickup device and has its opposite end suitably fixed to the upper end 101ᵃ of the left hand caster fork 101, at the right hand side of Figure 11.

As will be readily apparent, both sides of the pickup device may be raised or lowered simultaneously relatively to the supporting wheels by the above described adjusting mechanism by merely turning the crank 113 in the proper direction, and the pickup device will be held parallel to the ground in all adjusted positions, as gauged by the supporting wheels 100. In this connection, while a worm and worm gear mechanism of the self-locking type may be employed if desired, in the illustrated construction a locking strap 125 is shown for holding the crank 113 in adjusted position.

Referring now to Figures 10 and 11, the rotating pickup cylinder is indicated as an entirety by the reference numeral 131 and includes a supporting shaft 132 which is journaled at its opposite ends in bearings 133 carried at the lower ends of brackets 134 suitably secured at their upper ends to the side plates 105. The shaft 132 has a plurality of drum chain flanges mounted thereon in spaced relation thereacross. In the past, so far as I am aware, it has been customary to mount all of the drum chain flanges directly on the cylinder supporting shaft, but according to my present invention I have simplified the construction and reduced the weight of the rotating cylinder by not mounting all of such flanges directly upon the shaft 132. As illustrated in Figure 11, only the two end chain flanges 135 and 136 and the center chain flange 137 are carried on web portions 138 which are fixed to the shaft 132 by brackets 139. The manner of mounting the other intermediate drum chain flanges will be described shortly. A plurality of cylinder tooth bars 141 (in the present construction three) extend across the pickup device between suitable supports provided therefor on the drum chain flanges 135, 136 and 137, to which they are secured by bolts 142 (Figure 11). The remaining drum chain flanges which are indicated by the reference numeral 143 are spaced between those above described and are also bolted to the cylinder tooth bars 141 by bolts 144. The cylinder tooth bars provide the entire support for these latter drum chain flanges 143 as they have no supporting webs 138 on the shaft 132 as have the drum chain flanges 135, 136 and 137. In the present construction, therefore, by avoiding the use of the supporting webs for the drum chain flanges 143 the construction has been simplified and the weight of the pickup cylinder 131 reduced to an appreciable extent, thereby reducing the amount of power necessary to drive said cylinder. The usual plurality of spring pickup teeth 145 are carried on the several tooth bars 141 in spaced relation thereacross as shown in Figure 11, and their spring action permits them to readily yield when they strike stones or other obstructions in the operation of the machine in the field.

The pickup device is provided with the usual deck plate 151 which connects the side sheets or plates 105 and provides an inclined surface on which the hay is moved by conveyor chains which will be hereinafter described. This deck plate 151 extends down to a point just above the drum chain flanges, as indicated at 152 in Figures 10 and 11, at which point the plate 151 and the strippers 153 are attached to the bar 84. These strippers 153 are curved plates which are merely extensions of the deck plate as best shown in Figures 1 and 10, and they extend around the pickup cylinder 131, one stripper between each two chain flanges, and have ends 153ª terminate at and are fastened to a transversely disposed angle bar 154 (Figure 10) supported in fixed position in suitable brackets 155 beneath the deck, the upper ends of the brackets being suitably fixed to the side frame angles 85 and 86 at opposite sides of the pickup device.

Shorter extensions or plate members 157 of the deck plate 151 (see Figures 1 and 11) directly above the several drum chain flanges, terminate just above said flanges. Suitable slots 158 (Figure 1) are provided between the strippers and the shorter extensions 157, through which the pickup teeth 145 pass as the pickup cylinder 131 is rotated. As the pickup teeth pass through these slots 158 the hay is stripped from the teeth and left upon the strippers 153 where it is engaged by endless conveyor chains 160 one of which is trained around each of the several drum flanges as is usual in constructions of this type, there being teeth 160' fixed to said chains at intervals to facilitate moving the hay.

The stripping structure so far described is not new, but in the present construction I mount a novel stripper fender 161 in each of the slots 158 between the strippers 153 and the shorter extensions 157 of the deck plate 151 above described. One of these fenders 161 is shown in detail in Figure 12, and they are provided for the purpose of preventing the hay or other crop being harvested from being caught around the lower edge 152 of the deck plate 151, or under the transversely extending angle bar 84 of the frame, and also from getting entangled in the conveyor chains 160 beneath the deck-plate 151 as such chains pass over the takeup adjustment idler sprockets 165. The mounting of the takeup adjustment sprockets 165 will be described in detail later herein. Each of the fenders 161 is formed of sheet metal of the configuration shown in Figure 12 and includes a back wall 166 and two triangular shaped side walls 167 formed integral with the back wall 166. The back wall 166 is provided at its upper end with a rearwardly bent lip portion 168 which is adapted to overlie the forward edge of the deck plate 151, as shown in Figure 10, when the fender is mounted in position. Each of the side walls 167 is provided at its upper end with an outwardly extending flange portion 169 for attaching the fender to the stripper 153 and the shorter extension 157, each of the flange portions 169 being provided with a plurality of openings 170 for the reception of rivets or bolts 171 for that purpose. In operation, the pickup teeth 145 pass through the channels formed by the side walls 167 and the back wall 166 of the several fenders, the lower edge 172 of the back wall 166 just clearing the ends of the pickup cylinder teeth 145, thus tending to disengage any remaining hay from the teeth, and effectively preventing the hay from catching on the framework under the deck.

At the upper end of the pickup conveyor is a transversely extending shaft 180 journaled in suitable bearings 181, one of which is fixedly secured to the upper end of each of the side plates 105. Fixed on the shaft 180 is a plurality of flanged sprockets 182 which are respectively positioned in alinement with the several lower drum chain flanges above mentioned, and the upper ends of the endless conveyor chains 160 are trained around said sprockets 182. The particular type of flanged sprockets illustrated in the present application is substantially the same in construction as that fully illustrated, described and claimed in my copending application, Serial No. 21,705, filed May 16, 1935, and, therefore, they are not described in detail herein. A chain tightener 184 (see Figure 10) is provided in connection with each of the chains 160 whereby said chains may be adjusted to any desired tension, said chain tighteners being disposed in rear of the pickup cylinder 131. Each of the chain tighteners 184 comprises a pair of vertically extending parallel bars 185 secured to the transverse frame bar 84 one on each side of the sprocket 165 and having a longitudinally extending slot 186 therein through which the axle bolt 187 of the idler sprocket 165 above described is adapted to extend and along which slot said shaft 187 is adjustable, as will be readily appreciated.

Power for driving the cylinder and the endless conveyor of the pickup device is taken from the rear supporting wheel 22 of the hay press by the sprocket 38 as before mentioned. Referring now to Figures 1 and 3, a chain 191 is trained around the sprocket 38 and around a second sprocket 192 fixed on a shaft 193 which in turn is journaled in the vertically extending flanges of a bracket 194 fixed in any suitable manner to the outer of the lower frame angles 18. A suitable chain tightener 195 is secured to the frame angle 18 adjacent the chain 191, as by a bolt 196, and is provided for maintaining the chain 191 at the proper tension. A gear 197 fixed on the shaft 193 meshes with a gear 198 fixed on a second shaft 199 adjacent its outer end, said second shaft also being journaled in vertically extending flanges of the bracket 194. A slip clutch 201 is provided on the shaft 193 through which the gear 197 is driven, said clutch being provided to relieve the chain and sprocket mechanism of undue strains in case of overload of the pickup device. A universal joint 202 is fixed on the inner end of the shaft 199 and has telescopic connection, as shown at 203, with a universal joint 204 provided on the outer end of a shaft 205. The inner end of the shaft 205 is journaled in a suitable bracket 206 fixed on the frame angle 85 by means of bolts 207. A sprocket 208 is fixed on the shaft 205 and a chain 209 connects said sprocket 208 with a sprocket 211 (Figure 1) fixed on the end of the upper conveyor shaft 180 mentioned above.

Material is delivered from the pickup device to the press by means of a cross conveyor unit indicated by the reference numeral 219. The cross-conveyor 219 is supported on a suitable frame 220 comprising a pair of angle bars 221 and 222 (Figure 2) which extend laterally from the upper angle bars 17 of the hay press frame 16 in longitudinally spaced relation and are fixed thereto by bolts 223 (see Figures 1 and 7). The angle bar 221 extends only to the first frame bar 17 and is reenforced by a diagonal brace bar 224 (see Figure 7). The outer ends of the angle bars 221 and 222 are supported on the stub axle 27 on which the carrying wheel 28 is journaled by means of a pair of angle bars 225 which extend downwardly toward one another and have their lower ends fixed to a suitable casting 226 journaled on the axle 27 as shown in Figure 2, and the upper ends of the bars 225 are suitably fixed to the respective angle bars 221 and 222. A suitable cross brace 227 connects the angle bars 225 together as shown in Figure 2.

The upper end of the pickup device 82 is supported on the frame 220 and is connected to the front angle bar 221 by means of a ball and socket connection which is indicated as an entirety by the reference numeral 231 in Figures 2, 8 and 9. As best shown in Figures 8 and 9, this connection includes a pair of hinge plates 232 and 233, the plate 232 being bolted or otherwise fixedly secured to the outer end of the frame bar 221 while the other plate 233 is connected with the upper end of the pickup unit 82. Connected to the other plate 233 by means of a pair of bolts 234 and 236 is a split casting 235, and this split casting can be turned laterally about the bolt 234 as a pivot and fixed in any desired adjusted position by means of the bolt 236 which passes through a slot 237 in the hinge plate 233 (Figure 9) and clamps the two parts of the split casting 235 together. The upper end of the split casting is formed to receive a ball member 238 suitably connected as by a bolt 239 to the center of the base portion of a U-shaped angle bracket 241 that extends transversely the full width of the pickup device 82 and has upturned ends in the form of legs the upper ends of which are secured to the side plates 105 of the pickup device by bolts 242 (Figure 2). The ball member 238 is bolted at the center of the U-shaped bracket 241 so that the pickup unit 82 is free to pivot around this joint and also around the lower pivot 92 before described as it rolls along on the ground. For limiting the extent of this freedom of motion a chain 245 is provided, said chain being connected at one end to the split casting 235, as shown at 246, and having its opposite end connected, as shown at 247, to a diagonally extending frame member 248 which is suitably connected to the transversely extending U-shaped angle bracket 241 and to a vertical frame member 253. It will be seen, therefore, that this chain is thus connected across the ball and socket joint 231 and will act to prevent the pickup unit from falling to the ground in case the ball and socket joint should accidentally come apart or fail.

A separate frame is provided for supporting the pickup device 82 on the rear end of the baler frame during transport, and this frame is carried by the pickup unit at all times. As shown in Figures 2 and 3, this frame comprises a drawbar 251 having its forward end bolted or otherwise suitably fixed to the transverse frame member 87 of the pickup device and braced by a diagonal brace bar 252, and a frame member 253 suitably secured at its lower end to the drawbar 251 and having its upper end suitably connected to the transverse U-shaped bracket 241, as best shown in Figure 2. A hook 254 is provided on the rear end of the drawbar 251 and is adapted to engage a shackle 255 (Figure 2) fixed to a bracket 256 on the rear of the hay press, whereby the pickup unit may be pulled along in rear of the hay press in transporting the machine. The position of the drawbar 251 during transport is indicated in dotted lines in Figure 2. When the pickup unit is connected to the rear of the hay press for transport, the division block retainer 73 mentioned above can be folded up against the ends of the upper frame angles 17, around the pivot 68, or it may be removed entirely, as preferred.

The cross-conveyor unit 219 which receives the material from the pickup device 82 and delivers it to the hay press comprises an inner section 270 and an outer section 271. As shown in Figure 7, the outer section 271 carries a pair of brackets 272 having one end bolted thereto, as shown at 273, one of said brackets being positioned at each side of the section. The opposite ends of the brackets are pivotally connected as shown at 274 to the outer end of the inner section 270. The inner section is supported at its outer end on the angle bars 221 and 222 of the transverse frame by a pair of brackets 275 while at its inner end it is supported by suitable journal bearings 278 on a drive shaft 279, the drive shaft in turn being carried in bearings 281 provided in the upper ends of brackets 282 that are fixed at their lower ends on a horizontally extending angle member 283 which, in turn, is bolted or otherwise suitably secured to the angle members 221 and 222 as shown in Figure 7.

The inner section 270 of the transverse conveyor is provided with a deck sheet 285 (Figure 1) upon which the upper runs of a plurality of conveyor chains 286 are supported and slide. The conveyor chains 286 are trained around chain sprockets 287 fixed on the shaft 279. These chain sprockets 287 are preferably of the type illustrated and described in my pending application, Serial No. 21,705, filed May 16, 1935, but, of course, any other suitable type of chain sprocket may be employed. The inner section 270 is also provided with a rear gate 288 which provides a backstop against which the hay or other crop may be piled by the pickup device. An apron 289 (Figures 1 and 7) is provided for the purpose of filling in the space between the hay press and the pickup device, and the edges are curled as shown to avoid the possibility of hay on the cross-conveyor catching thereon.

The outer section 271 of the transverse conveyor includes a deck sheet or plate 290, an end shield 291, and a removable rear gate section 292. Flanged chain sprockets 293 in alinement with the chain sprockets 287 of the section 270 are mounted on adjustable brackets 294 carried by the section frame (Figures 2 and 7), and the chains 286 are trained around these flanged sprockets. By adjusting the brackets 294 relative to the frame the chains 286 may be loosened or tightened as desired, as will be readily understood. The conveyor chains 286 are driven by the flanged chain sprockets 287 fixed on the drive shaft 279, said shaft being connected through a slip clutch 296 to a gear box 297 (Figure 1) containing a set of suitable reversing gears by means of which the conveyor drive shaft 279 may be selectively operated in either direction, or stopped, in response to a control lever 298 suitably supported adjacent an operator's platform 300, said lever being connected by a rod 299 to the gear controlling mechanism contained in the gear box 297.

The cross-conveyor chains are driven by power derived from the gasoline motor M, which is mounted on the hay press frame over the front supporting wheel 19 as before described. As shown in Figure 1, the motor M drives a shaft 301 by means of a belt and pulley drive 302, and a set of spur gears 303 connects the shaft 301 with a sprocket 304 which in turn is connected by a chain 305 to a sprocket 306 fixed on the drive shaft 307 of the gear box 297 above mentioned. The hay press mechanism, which has not been illustrated as the present invention is not particularly concerned therewith, is also driven from the shaft 301.

As shown in Figure 8, bridging means is provided for connecting the upper end of the deck sheet 151 of the pickup device 82 with the conveyor 219, and this means includes a pair of overlapping pieces 311 and 312 made of heavy canvas or belting. The piece 311 at its forward edge is riveted, as shown at 314, or otherwise suitably secured to a curved upper extension 151ª of the pickup deck sheet 151, while the piece 312 at its rear edge is suitably fixed to the upper edge of the front side sheet 315 of the cross-conveyor 219 by means of rivets 316 or the like. The rear end of the curved deck extension 151ª is braced by a plurality of straps 318 connected at their upper ends to said extension section 151ª and at their lower ends to the U-shaped bracket 241. A spring 319 is connected between each of the straps 318 and the forward side sheet 315 of the cross-conveyor, said springs tending to hold the parts together and also acting as supports for the overlapping strips 311 and 312. This construction insures always having a continuous supporting sheet between the deck sheet 151 of the pickup device 82 and the cross-conveyor 219 for the passage of the hay, regardless of any relative movement or misalinement which may occur between the pickup unit and the cross-conveyor unit.

The operation of the hay press and windrow pick-up device is as follows: The motor M is first started, thereby setting in operation the hay press mechanism and the cross-conveyor mechanism. As the machine is pulled forward across the field by a tractor or other propelling means the pickup mechanism, which straddles a windrow of the hay or other crop, is caused to operate by power from the supporting wheel 22, and such pickup mechanism will continue to operate as long as the machine is moved forward. The forward motion of the machine drives the cylinder 131 and the cylinder teeth 145 thereon pick up the hay or other crop in the windrows and deposit it on the deck sheet 151, the strippers 153 acting to remove the hay from the teeth or fingers 145. The hay is then moved upward by the pickup conveyor chains 160 and delivered to the cross-conveyor 219, which in turn carries it to the feed chamber of the hay press. As the delivery of the hay to the press must be interrupted from time to time as a bale is completed and removed, the operation of the cross-conveyor is stopped and reversed by means of the gear selecting mechanism 297, which reversal separates the hay which is about to be delivered to the press from the hay in the press so that the division block may be inserted. Hay carried backward when the cross-conveyor is thus put in reverse action is held by the end shield 291, which extends upwardly and outwardly away from the deck sheet or plate 285. The flanges on the sprockets 293, operating in conjunction with the slots in the outer end of the deck sheet 285 (Figure 1), serve to strip the hay from the outer ends of the chains 286 when the latter are driven backward, thereby preventing the hay from being carried over into the lower runs of the conveyor chains. It will be noted that the shield 291 extends upwardly for a considerable distance, thus accommodating and holding a relatively great amount of hay and permitting the operator to have ample time to insert the division block. After the division block is inserted the cross-conveyor is again reversed so as to feed the hay to the press until the next bale is completed, and so on.

When the machine is to be transported, the pickup unit 82 is disconnected at the ball and socket joint 231, preferably by unbolting the ball member of the joint from the angle bar bracket 241, the two pivot joints 89 and 95, the telescopic shaft connection 203 and the springs 319. The pickup unit may then be removed from alongside of the hay press and moved to the rear thereof where it is placed in reverse position, after which it can be connected to the rear of the hay press by attaching the hook 254 of the auxiliary drawbar 251 to the shackle 255 fixed to the bracket 256 on the rear of the hay press as before described.

The outer section 271 of the cross-conveyor may then be folded over on to the inner section 270 thereof after the rear gate 292 of the outer section 271 has been removed. The two sections are adapted to be secured together in folded position by means of a bracket 325 (Figures 1 and 7) secured to the rear end gate 288 of the inner section 270 and is adapted to be engaged by a bolt 326 carried by the end shield 291 of the outer section 271. With the present construction the outer section of the cross-conveyor can be folded over the inner section without disconnecting the conveyor chains 286, which is a very advantageous feature.

When it is desired to use the machine as a stationary hay press without the pickup device, this may readily be accomplished by removing the bracket 275 (Fig. 7) from the inner section, swinging it through an angle of approximately 180 degrees about the other securing bolt, and replacing said bracket in reverse position, as shown in dotted lines, to thereby give the conveyor a downward slant to make it more convenient for throwing hay on to the cross-conveyor from a stack, but it is not necessary to lower the cross-conveyor in this manner as it may be left level. Obviously either of the securing bolts of the bracket 275 may be removed and the latter swung about the other to reversed position. Also, if desired, the hopper end shield 291 may be removed and the hay fed onto the cross-conveyor from the open end, rather than from the front as is necessary when the shield 291 is left in position.

I claim:

1. In harvesting mechanism having a mobile frame, the combination of a pickup device, detachable means connecting said pickup device to said mobile frame in operating position, a drawbar separate from said connecting means and rigidly fixed at one end to the lower portion of said pickup device, means at the opposite end of said drawbar and adapted to cooperate with means carried by the mobile frame for pivotally connecting said pickup device for lateral swinging movement to the rear end of the mobile frame in transport position, and means carried by the drawbar and rigidly connected to the upper portion of the pickup device for supporting said upper portion during transport.

2. In harvesting mechanism having a mobile frame, the combination of a pick-up device and a cross conveyor for feeding material from the pickup device to the mobile frame, a supporting frame for said cross-conveyor connected to said mobile frame, said cross conveyor being movable vertically relative to said supporting frame, and a pair of brackets detachably connecting said cross-conveyor to its supporting frame whereby said conveyor is normally held in a horizontal plane to receive material from the pickup device, said brackets being reversible end for end to incline the outer end of the conveyor downwardly to facilitate feeding material thereto by hand.

3. A pickup device for harvesters, comprising a plurality of endless conveyor chains, sprockets for said conveyor chains supported adjacent the forward end of said pickup device, a toothed pickup cylinder carried at the forward end of said pickup device, a deck plate for supporting said conveyor chains having its forward end terminating above said sprockets, stripping means extending forwardly from said deck plate adjacent said sprockets to provide a slot through which the cylinder teeth pass, and a stripper fender mounted in each of said slots and partially surrounding the teeth of said pickup cylinder but disposed out of the path thereof for preventing the harvested material from becoming entangled with parts below said deck plate.

4. A pickup device for harvesters, comprising a plurality of endless conveyor chains, means for receiving the lower ends of said conveyor chains mounted adjacent the forward end of said pickup device, a toothed pickup cylinder carried at the forward end of said pickup device, a deck plate for supporting said conveyor chains having its forward end terminating above said chain receiving means, strippers extending forwardly from said deck plate between adjacent chain receiving means, plate members extending forwardly from said deck plate and spaced from said strippers to provide a slot therebetween for the cylinder teeth, and a stripper fender comprising a pair of side walls and a rear wall connecting said side walls, said walls extending generally in the direction of movement of said cylinder teeth, there being a stripper fender mounted in each of said slots for preventing the harvested material from engaging parts below said deck plate.

5. A stripper fender for a pickup device comprising a sheet material member including a pair of spaced side walls, a rear wall formed integrally with said side walls and having a lip portion extending beyond the upper end portions of said side walls, and attaching flanges extending laterally from the free edges thereof, said lip portion and attaching flanges being disposed in substantially the same plane.

6. In harvesting mechanism comprising a mobile frame, the combination of a pickup device and a cross-conveyor for feeding the material from said pickup device to said mobile frame, such pickup device being movable fore and aft relative to said cross-conveyor, a deck plate on said pickup device extending rearwardly therefrom, and overlapping means for closing the opening between said end of the deck plate and the front side of the cross-conveyor comprising a part attached to said deck-plate and another part attached to said cross-conveyor.

7. In harvesting mechanism having a mobile frame, the combination of a pickup device and a cross-conveyor for feeding the material from said pickup device to said mobile frame, a deck plate on said pickup device extending rearwardly therefrom, a plurality of straps supporting the rear end of said deck plate at spaced points therealong, means for closing the opening between said end and the front side of the cross-conveyor comprising a pair of overlapping flexible sheets carried respectively by said deck plate and said cross-conveyor, and a spring connecting each of said straps with the cross-conveyor whereby said overlapping sheets are held together in flexible relation, said springs also serving to support said flexible sheets at spaced points therealong when said overlapping sheets yield under the weight of the material being delivered from the pickup device to the cross-conveyor.

8. In harvesting mechanism having a mobile frame, the combination of a cross-conveyor frame, a pickup device, a laterally outwardly extending push bar connected with the mobile frame for vertical movement about a longitudinal axis, brace means pivoted to said mobile frame and connected with said push bar for rendering the latter rigid against longitudinal displacement, means connecting the pickup device to the outer end of said push bar for pivotal movement about an axis parallel to said first axis, supporting wheels for the lower end of the pickup device, and means supporting the upper end portion of the pickup device on the conveyor frame comprising a part movable in a generally fore and aft direction relative to said conveyor frame, the movable portion of said part being connected to the pickup device.

9. In a pickup device having a chain conveyor, a rotating cylinder, a supporting shaft for said cylinder, a plurality of chain receiving members fixed to said shaft and around which conveyor chains of the pickup device are trained, each of said members having radially outwardly extending spaced-apart flanges extending radially beyond the chains, a plurality of tooth supporting bars extending across said cylinder, means connecting the intermediate portions of said flanged members to said tooth supporting bars, and means on said members between said flanges adapted to engage the conveyor chains to prevent slippage thereof.

10. In a pickup device having a chain conveyor, a rotating cylinder, a supporting shaft for said cylinder, a plurality of drum chain flanges fixed to said shaft and around which conveyor chains of the pickup device are trained, a plurality of tooth supporting bars extending across said cylinder, and means connecting said tooth-supporting bars to said drum chain flanges, said connecting means providing means for engaging the conveyor chains to prevent slippage thereof.

11. In a pickup device having a chain conveyor, a rotating cylinder, a supporting shaft for said cylinder, a plurality of drum chain flanges fixed to said shaft and around which conveyor chains of the pickup device are trained, a plurality of tooth supporting bars extending across said cylinder, a plurality of bolts connecting said drum chain flanges to said tooth-supporting bars, portions of said bolts engaging said conveyor chains to prevent slippage thereof.

12. A pickup device for harvesters including a plurality of endless conveyor chains, a deck plate for supporting said conveyor chains, spaced stripping members extending outwardly at the end of said deck plate and forming slots through which said chains move, and stripper fenders extending below and on opposite sides of the slots in said deck plate and supported by the latter between adjacent stripping members for preventing the harvested material from becoming entangled with parts below said deck plate.

13. A pickup device for harvesters including means for picking up and conveying material, a deck plate for supporting said conveying means, spaced apart downwardly curved members at the end of said deck plate for stripping the material from said means, and stripper fenders cooperating with said downwardly curved members for preventing harvested material from becoming entangled with parts below said deck plate, each having laterally disposed flanges adapted to be secured to adjacent members so that the associated stripping fender lies generally between said adjacent members.

14. In harvesting mechanism having a mobile frame, a combination of a pickup device, draft means connecting said pickup device with said mobile frame comprising a member extending laterally from said mobile frame and pivotally connected to the latter for vertical swinging movement, a second member connected at its outer end to the outer end of said first member and extending diagonally inwardly and rearwardly, means pivotally connecting the inner end of said diagonal member to the mobile frame, and means pivotally connecting said pickup device to said member substantially on the fore and aft extending center line of said device for movement relative thereto about a fore and aft extending horizontal axis, and ground engaging means for supporting the lower end of said pickup device.

15. In harvesting mechanism having a mobile frame, the combination of a pickup device, draft means connecting said pickup device with said mobile frame comprising a generally triangular frame extending laterally from said mobile frame and pivotally connected to the latter by means of fore and aft spaced pivots disposed in axial alignment, and pivot means at the laterally outer apical end of said draft frame spaced laterally from said first mentioned pivots and disposed substantially parallel thereto for connecting said pickup device to the free end of said draft frame, and means cooperating with said pickup device and said frame for limiting the swinging movement of said pickup device relative to said draft frame.

16. In harvesting mechanism having a mobile frame, the combination of a pickup device, draft means connecting the lower portion of said pickup device with said mobile frame permitting vertical movement of said device relative to said frame and providing for lateral tilting movement of said device, a supporting beam rigidly mounted on said mobile frame above said draft means and extending laterally therefrom, and universal joint means for supporting the upper end of said pickup device on said beam while permitting said vertical and said tilting movements of said device.

17. In harvesting mechanism having a mobile frame, the combination of a pickup device, means extending laterally from the side of the mobile frame and connected with the lower rear portion of said pickup device with said mobile frame, said means permitting vertical movement of said device relative to said frame and providing for lateral tilting movement of said device, a supporting beam rigidly mounted on said mobile frame and extending laterally therefrom rearwardly of said laterally extending means, and a ball and socket joint means for supporting the upper end of said pickup device on said beam and providing for universal movement of said device relative to said laterally extending rigid beam.

18. In harvesting mechanism having a mobile frame, the combination of a laterally extending beam rigidly supported thereon, a pickup device, and universal joint means for supporting said device on said beam including cooperative ball and socket members mounted on said beam and said device, respectively, one of said members being rockably mounted to provide for general bodily movement of the supported portion of said pickup device relative to said rigidly supported beam.

19. In harvesting mechanism having a mobile frame, the combination of a cross conveyor including a frame fixed rigidly to said mobile frame, a pickup device, and means for supporting said device including cooperative ball and socket members mounted on said device and on said cross conveyor frame, respectively, and means swingably mounting said socket member on said conveyor frame so as to provide for generally longitudinal movement of said pick-up device relative to said cross conveyor frame.

20. In an agricultural implement, a main wheel supported frame, an auxiliary frame, ground-engaging means for supporting the lower end of said auxiliary frame, longitudinally rigid draft means pivotally connected for vertical swinging movement to the side of said main frame about a longitudinal axis and pivotally connected at its outer portion to said auxiliary frame for movement relative thereto about a longitudinal axis, and means disposed above said draft means for supporting the upper end of said auxiliary frame on said main frame providing for independent movement of said auxiliary frame as the implement moves forwardly and acts through said draft means for propelling the auxiliary frame, including cooperative ball and socket members mounted on said main and auxiliary frames, respectively.

21. In an agricultural implement, a main wheel supported frame, an auxiliary frame, ground engaging means for supporting the lower end of said auxiliary frame, and means for supporting the upper end of said auxiliary frame on said main frame providing for independent movement of said auxiliary frame as the implement moves forwardly, including a connecting member hinged to one of said frames, and cooperative ball and socket members mounted on said connecting member and the other of said frames, respectively.

22. In harvesting mechanism having a mobile frame, the combination of a pickup device having a frame, and universal joint means for supporting said pickup device on said mobile frame including a connecting member hingedly connected to one of said frames, and cooperative ball and socket members mounted on said connecting member and on the other of said frames, respectively.

23. In harvesting mechanism having a mobile frame, the combination of a laterally extending cross conveyor frame, a pickup device having a frame, ground engaging means for supporting the lower end of said pickup frame, draft means connecting the pickup device with the mobile frame, and swivel means connecting the upper end of the frame of the pickup device with the cross conveyor frame including a connecting member hingedly connected to one of said frames and cooperative ball and socket members mounted on said connecting member and on the other of said frames, respectively.

24. In an agricultural implement including a wheel supported main frame and an auxiliary frame, ground engaging means for supporting the lower end of said auxiliary frame, draft means connecting said auxiliary frame to said main frame for independent vertical movement and lateral tilting movement of said auxiliary frame as the implement moves forwardly, and means for supporting the upper end of said auxiliary frame on said main frame including a connecting member hinged to one of said frames, a second connecting member adjustably fixed to said connecting member, and cooperative ball and socket members mounted on said auxiliary frame and on said second connecting members, respectively, said ball and socket members accommodating said lateral tilting movement of the auxiliary frame and the hinged connecting member and said ball and socket members accommodating general bodily movement of the upper end of the auxiliary frame relative to said main frame as the auxiliary frame moves vertically.

25. In harvesting mechanism having a mobile frame, the combination of a pickup device having a frame, draft means connecting one end of said pickup device with said mobile frame comprising a member extending laterally from said mobile frame and pivotally connected to the latter for vertical swinging movement, and means pivotally connecting said one end of the pickup device to said member substantially on the fore and aft extending center line of said device for movement relative thereto about a fore and aft extending horizontal axis, and universal joint means spaced from said draft means for supporting the other end of said pickup device on said mobile frame including a connecting member hingedly connected to one of said frames, and cooperative ball and socket members mounted on said connecting member and on the other of said frames, respectively.

26. A crop conveying device comprising a deck plate having slots therein, a plurality of teeth movable relative to said deck plate for moving harvested material thereon, said teeth being movable from crop engaging positions above said deck downwardly through said slots to disengage said teeth from said material, and fenders positioned within said slots having portions extending away from the general plane of the deck plate in the general direction of movement of the teeth through said slots but out of the path of movement of said teeth to prevent any material carried by the downwardly moving teeth becoming entangled beneath said deck plate.

27. A crop conveying device comprising a deck plate having slots therein, a plurality of teeth movable relative to said deck plate for moving harvested material thereon, said teeth being movable from crop engaging positions above said deck downwardly through said slots to disengage said teeth from said material, and fenders positioned within said slots to prevent any material carried by the downwardly moving teeth becoming entangled beneath said deck plate, said fenders comprising skirts depending from the side edges of said deck plate adjacent said slots.

28. A crop conveying device comprising a deck plate for receiving harvested material and having longitudinally extending slots disposed therein, a plurality of teeth movable relative to said deck plate for urging said harvested material longitudinally thereof, said teeth being movable downwardly through said slots to disengage said teeth from said material, and fenders comprising skirts depending from the end and side edges of said plate around said slots to prevent said material from wrapping over said edges of the plate.

29. A crop conveying device comprising a deck plate for receiving harvested material and having longitudinally extending slots in an end thereof a plurality of teeth movable about a transversely disposed axis near said end of the deck plate, said teeth being adapted to engage said material on said deck to urge it therealong, and pass downwardly through said slots about said axis to disengage the teeth from said material, and fenders comprising skirts depending from the edges of the deck around said slots and disposed out of the path of movement of said teeth for preventing said material from wrapping around and lodging upon said edges.

30. A pickup device comprising an inclined deck plate, a rotary reel disposed adjacent the lower end thereof and having generally radially extending crop engaging teeth, said deck plate including stripper means defining a plurality of longitudinally extending slots for receiving said teeth as said reel revolves, said teeth extending through the slots to engage the harvested material to move it on said deck plate and passing down through the slots to disengage therefrom, and fenders comprising skirts depending from the end and side edges of the plate around said slots and extending below parts on the lower side of said deck plate to prevent said material from wrapping around and lodging on the edges of said plate or on said parts.

31. In harvesting mechanism having a mobile frame, the combination of a pickup device and a cross conveyor for feeding material from the pickup device to the mobile frame, a supporting frame for said cross conveyor connected to said mobile frame, means pivotally supporting one end of said cross conveyor on said supporting frame, and means pivotally mounted on said conveyor frame and swingable through substantially 180° from one position to the other to support the conveyor in either of two positions, said conveyor reacting against said pivot in at least one of its positions for preventing said means from swinging into its other position.

32. A windrow pickup press as defined in claim 31 wherein said swingable means is also pivoted to the cross conveyor.

33. A pickup device for harvesters, comprising a rotating cylinder, a supporting shaft for said cylinder, a plurality of tooth supporting bars extending across said cylinder, a plurality of chain receiving means fixed to said bars, a plurality of endless conveyor chains trained around said chain receiving means, a plurality of teeth having inner ends coiled about and fixed to said tooth supporting bars adjacent said chain receiving means, a deck plate for supporting said conveyor chains and including curved stripper plates encircling said cylinder adjacent said chain receiving means and spaced apart to accommodate the coiled ends of said pickup teeth, and plate members extending from said deck plate adjacent one edge of said stripping means and disposed outside the path of movement of the ends of said pickup teeth but cooperating with said stripper means to provide relatively narrow slots through which the outer portions of said pickup teeth move when said cylinder is rotated.

34. A pickup device for harvesters comprising a toothed pickup cylinder carried at the forward end of said pickup device, a main frame supporting said pickup cylinder, a plurality of endless conveyor chains, means mounted on said pickup cylinder for receiving said chains, a deck plate for supporting the upper portions of said conveyor chains, the forward end of said deck plate terminating above said chain receiving means and said cylinder, depending brackets supported by said main frame, a cross bar carried by said brackets, and strippers extending forwardly and downwardly from said deck plate between adjacent chain receiving means on said cylinder, said strippers encircling said cylinder and having their lower ends fixed to said cross bar.

35. In a pickup device, the combination of a deck plate having a plurality of slots along one edge, and a stripper fender for each slot comprising a sheet metal member having a pair of spaced side walls, a rear wall formed integrally with said side walls and attaching flanges carried by said side walls, said flanges being arranged so that when the stripper fender is mounted in the associated slots, the rear wall extends substantially at right angles to the general plane of said deck plate and the lower edge of said side walls extend in a plane that intersects the plane of the deck plate.

36. In a pickup device having a chain conveyor and a rotating cylinder including a supporting shaft for said cylinder, a plurality of tooth supporting bars extending across said cylinder, and means supporting said bars on said shaft, the combination of a plurality of channeled members each having an intermediate section and radially outwardly spaced apart flanges encircling said bars, and means extending through the intermediate section of each of said channeled members and the adjacent portions of said tooth supporting bars for securing said channeled members to said bars.

37. The combination of claim 36 wherein said securing means includes parts serving as chain-engaging means to prevent slippage of the chains within said channeled members.

38. In harvesting mechanism having a mobile frame, the combination of a pickup device having a frame, universal joint means for supporting said pickup device from said mobile frame, including a connecting member hingedly connected to one of said frames, cooperating ball and socket members, means connecting one of said members with the other of said frames, and means connecting the other ball and socket member for lateral swinging movement to said hinged connecting member.

39. The combination of claim 38 wherein means is provided for limiting the relative movement between said hinged connecting member and said pivoted ball and socket member.

40. The combination of claim 38 wherein means is loosely connected between said frames for supporting said pickup device in the event of failure of said universal joint means.

41. In harvesting mechanism having a mobile frame, the combination of a laterally rigid part extending laterally from said frame adjacent the upper portion thereof, a pickup device including a downwardly and forwardly inclined structure, vertically swingable draft means rigid in a longitudinal direction and pivotally connected at its outer end to the lower portion of said pickup device for pushing the same along when the mobile frame is moved, and a ball and socket joint providing substantially universal movement connected between the upper portion of said downwardly and forwardly inclined pickup structure for supporting the upper end of the latter on said laterally extending rigid member.

42. In harvesting mechanism having a mobile frame, the combination of a pickup device and a cross-conveyor for receiving material from the pickup device comprising a deck plate on which hay or the like is deposited, a plurality of conveyor chains having upper runs movable over said plate and lower runs below said plate, reversible means for driving said chains, and means at the outer end of the cross-conveyor for removing material from the upper runs of said chains and holding said material when the chains are driven backward.

43. In harvesting mechanism having a mobile frame, the combination of a pickup device and a cross-conveyor for receiving material from the pickup device comprising a deck plate on which hay or the like is deposited, a plurality of conveyor chains having upper runs movable over said plate and lower runs below said plate, reversible means for driving said chains, and an end shield extending upwardly from the outer end of the deck plate to hold hay on the latter when the chains are driven backward.

44. In harvesting mechanism having a mobile frame, the combination of a pickup device, and a cross conveyor for receiving material from the pickup device, comprising a deck plate on which hay or the like is deposited, there being slots at opposite ends of said deck plate, a plurality of flanged sprockets supported in said slots, a plurality of conveyor chains trained over said flanged sprockets and having upper runs movable over said deck plate and lower runs below said plate, reversible means for driving said chains, the flanged sprockets and the slotted portion of the deck plate at the outer end of the cross-conveyor serving to strip hay from the upper runs of said chains when the latter are driven backward, and means for receiving hay from the upper runs of said chains and holding the hay during the time the conveyor chains are driven backward.

45. In harvesting mechanism having a mobile frame, the combination of a cross conveyor frame attached to said frame and extending laterally therefrom, a pickup device including a fore and aft extending inclined platform disposed adjacent said cross conveyor frame and having mechanism for delivering a crop from a windrow to said cross conveyor, ground engaging means for supporting the lower end of said platform, a vertically movable draft connection between the lower end of said platform and said mobile frame permitting vertical movement and lateral tilting movement of said platform relative to said mobile frame, and connecting means pivotally connected to said platform and said frame, respectively, for swingably supporting the upper end of said platform on said cross conveyor frame, said connecting means being shiftable fore and aft whereby draft force is prevented from being transmitted to said cross conveyor frame.

46. In harvesting mechanism having a mobile frame, the combination of a cross-conveyor frame attached to said mobile frame and extending laterally therefrom, a pickup device including a fore and aft extending inclined platform disposed adjacent said cross-conveyor frame and having mechanism for delivering a crop from a windrow to said cross-conveyor, ground engaging means for supporting the lower end of said platform, a draft frame extending laterally from said mobile frame and connected thereto for vertical swinging movement about a longitudinally extending axis, said draft frame being connected to transmit draft force to the lower end of said platform and adapted to restrain fore and aft movement of the latter relative to said mobile frame while permitting vertical movement relative thereto, and flexible attaching means comprising a member pivoted at opposite ends to said platform and said cross conveyor frame, respectively, for supporting the upper end of said platform on said cross conveyor frame, said attaching means being shiftable fore and aft to prevent draft force being transmitted through the latter but permitting said vertical movement of the platform.

47. In harvesting mechanism having a mobile frame, the combination of a pickup device, detachable means connecting said pickup device to said mobile frame for pushing the pickup device in operating position at one side of said frame, a frame member separate from the connecting means rigidly connected to said pickup device and extending rearwardly from the central portion thereof when said device is in operating position alongside the mobile frame, and means carried by the rear end of the mobile frame for receiving the end of said rigid member and connecting said pickup device in reverse position to the mobile frame for trånsport.

48. In harvesting mechanism having a mobile frame, the combination of a cross-conveyor including a frame, a pickup device, draft means connecting the pickup device with the mobile frame and accommodating vertical swinging movement of said pickup device relative to said mobile frame, ground engaging supporting means for the lower end of the pickup device, and fore and aft shiftable swivel means supporting the upper end of the pickup device on the cross-conveyor frame in a position to discharge into the cross-conveyor and accommodating said swinging movement of the pickup device relative to said baler frame, said shiftable swivel means comprising a member having a swivel connection with said pickup device and pivotally connected to said cross-conveyor.

49. In harvesting mechanism having a mobile frame, the combination of a cross-conveyor frame and a pickup device, means including a push bar pivotally connecting the lower end of the pickup device with the mobile frame for relative vertical swinging movement, generally fore and aft shiftable swivel means supporting the upper end portion of the pickup device on the conveyor frame for relative fore and aft shifting movement, said shiftable swivel means comprising a member having a swivel connection with said pickup device and pivotally connected to said cross conveyor, and normally inactive auxiliary means connecting the upper end of the pickup device with said cross-conveyor frame for supporting the upper end of said pickup device upon disconnection of said swivel means.

FRANK D. JONES.